US012583624B2

(12) United States Patent
Steensgaard-Frandsen et al.

(10) Patent No.: US 12,583,624 B2
(45) Date of Patent: Mar. 24, 2026

(54) PALLET FOR TRANSPORTING CARGO

(71) Applicant: Power Stow International ApS,
Gadstrup (DK)

(72) Inventors: Andreas Steensgaard-Frandsen,
Gadstrup (DK); Martin Vestergaard,
Gadstrup (DK)

(73) Assignee: Power Stow International ApS,
Gadstrup (DK)

( * ) Notice: Subject to any disclaimer, the term of this
patent is extended or adjusted under 35
U.S.C. 154(b) by 92 days.

(21) Appl. No.: 18/654,885

(22) Filed: May 3, 2024

(65) Prior Publication Data

US 2024/0367820 A1    Nov. 7, 2024

(30) Foreign Application Priority Data

May 4, 2023    (EP) ..................................... 23171655

(51) Int. Cl.
*B64F 5/50*        (2017.01)
*B64F 1/32*        (2006.01)
*B65G 15/42*       (2006.01)

(52) U.S. Cl.
CPC .................. *B64F 5/50* (2017.01); *B64F 1/32*
(2013.01); *B65G 15/42* (2013.01); *B64F 1/322*
(2020.01); *B64F 1/324* (2020.01)

(58) Field of Classification Search
CPC ............. B64F 1/32; B64F 1/322; B64F 1/324
See application file for complete search history.

(56) References Cited

U.S. PATENT DOCUMENTS

| | | | |
|---|---|---|---|
| 5,624,030 A | 4/1997 | Rademacher | |
| 9,346,584 B1 * | 5/2016 | Kokojan | ................ B65D 90/12 |
| 10,183,814 B2 * | 1/2019 | Fourney | ................ B65G 59/02 |
| 2004/0033126 A1 * | 2/2004 | Thogersen | ............. B64F 1/324 |
| | | | 414/398 |
| 2010/0326797 A1 * | 12/2010 | Borden | ............. H01L 21/67721 |
| | | | 414/805 |
| 2015/0239669 A1 * | 8/2015 | Miller | .................... B65G 23/04 |
| | | | 209/583 |
| 2021/0086900 A1 * | 3/2021 | Christoffersson | ........ B64D 9/00 |

FOREIGN PATENT DOCUMENTS

| | | | | |
|---|---|---|---|---|
| CN | 203652327 U | 6/2014 | | |
| CN | 109018601 A | 12/2018 | | |
| CN | 212557272 U | 2/2021 | | |
| CN | 113184332 A | 7/2021 | | |
| DE | 202021102610 U1 * | 5/2021 | ........... | B65G 17/002 |
| EP | 1136374 A1 | 9/2001 | | |
| WO | 1997038839 A1 | 10/1997 | | |

* cited by examiner

*Primary Examiner* — Richard G Davis
(74) *Attorney, Agent, or Firm* — Dinsmore & Shohl LLP

(57)        ABSTRACT

A pallet for transporting cargo on an inclined conveyer belt
with a surface texture including a plurality of recesses. The
pallet comprises an upper surface for supporting the cargo
and a bottom side supported by the included conveyer belt.
The bottom side has a plurality of protrusions distributed
across the area of the bottom side for engaging the plurality
of recesses and arresting the pallet when the pallet is
transported on the inclined conveyer belt.

9 Claims, 3 Drawing Sheets

PALLET FOR TRANSPORTING CARGO

CROSS REFERENCE TO RELATED APPLICATIONS

This application claims the priority benefit of European Patent Application EP 23171655.6, entitled "A PALLET FOR TRANSPORTING CARGO" and filed May 4, 2023, the entire contents which are incorporated herein by reference its entirety.

FIELD

The present disclosure is directed to transport of cargo on an inclined conveyor belt, specifically transporting an aircraft wheel from tarmac level to the cargo hold of an aircraft by means of an aircraft belt loader.

BACKGROUND

In some airports forklifts are not allowed near aircrafts and can therefore not be used to load or unload cargo from the aircraft.

For some aircrafts belt loaders are used to transport the cargo between tarmac level and the aircraft cargo hold. However, this means that the cargo is on an inclined surface when the cargo is on the inclined conveyor belt of the aircraft belt loader.

If the friction between the conveyor belt and the cargo is too low, the cargo will fall down. Similarly, if the cargo is supported on a pallet, the pallet will fall down if the friction between the conveyor belt and the pallet is too low.

SUMMARY

In an aspect, a pallet for transporting cargo on an inclined conveyor belt having a surface texture including a plurality of recesses arranged in a first pattern, the pallet comprising a body and a plurality of handles. The body, having a round shape and defining a circumference, comprises an upper surface and a bottom surface. The bottom surface is opposite the upper surface and defines an area and has a plurality of protrusions including a first protrusion defining a truncated pyramid shape, the plurality of protrusions being distributed across the area of the bottom surface in a second pattern such that the plurality of protrusions are correspondingly shaped and sized with the plurality of recesses, such that, when the inclined conveyer belt supports the body, the recesses and the protrusions interact to maintain a positioning of the pallet on the inclined conveyer belt. The plurality of handles is disposed around the circumference of the body.

DETAILED DESCRIPTION

Figure 1:
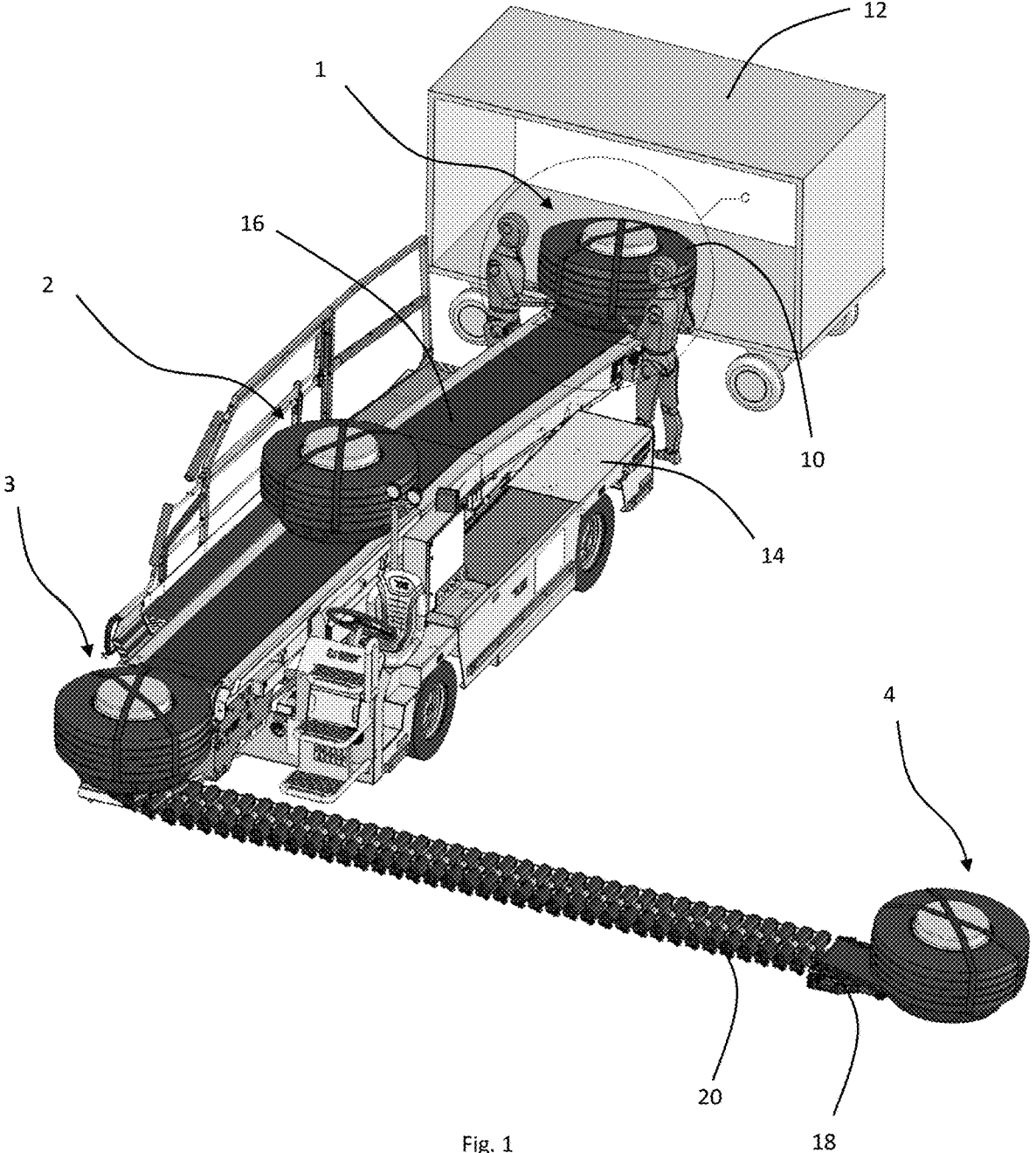
FIG. 1 illustrates an aircraft wheel on a conveyer belt.

The present disclosure relates to a pallet for transporting cargo on an inclined conveyer belt. The inclined conveyer belt described herein have a surface texture including a plurality of recesses arranged in a first pattern.

A first aspect of the present disclosure is a pallet for transporting cargo on an inclined conveyor belt, the inclined conveyor belt having a surface texture including a plurality of recesses arranged in a first pattern, the pallet comprising an upper surface for supporting said cargo and a bottom side supported by said inclined conveyor belt during intended operational use.

The bottom side may have a plurality of protrusions including a first protrusion distributed across the area of said bottom side in a second pattern such that said plurality of protrusions fits down into said plurality of recesses for arresting said pallet when said pallet is transported on said inclined conveyor belt.

With recess is meant a pattern of valleys and ridges, e.g. there is a distance greater than zero between the top of a ridge and the bottom of the valley. It is contemplated that the ridges are tapered, e.g. having an inclination (different from 90 degrees).

By arrested is meant that the pallet is not to slide on the conveyor belt but moved along by the conveyor belt. Otherwise, the pallet may slide down due to gravity.

In the following, specific examples according to aspects of the present disclosure will be explained in more detail with reference to the accompanying drawings. The present disclosure may, however, be embodied in different forms than depicted below, and should not be construed as limited to any examples set forth herein. Rather, any examples are provided so that the disclosure will be thorough and complete, and will fully convey the scope of the invention to those skilled in the art. Like reference numerals refer to like elements throughout. Like elements will, thus, not be described in detail with respect to the description of each figure.

FIG. 1 shows an overview of the transport of an aircraft wheel 10 from a baggage cart 12 into the cargo hold of an aircraft (the aircraft has been omitted in the figure).

An aircraft belt loader 14 is illustrated between the baggage cart and the aircraft. The aircraft belt loader has a conveyor belt 16 that can be inclined such that baggage can be transported between tarmac level and the cargo hold of the aircraft.

In FIG. 1 the conveyor belt is illustrated with only a small inclination.

The aircraft belt loader comprises a roller track 18 that extends from the front end of the conveyor belt and into the cargo hold. The roller track can be stored away inside the frame of the aircraft belt loader. The roller track comprises a plurality of rollers including a first roller 20 for rolling the cargo along the roller track.

The back end of the conveyor belt is adjacent the baggage cart, and two baggage handlers are illustrated at the back end. The two baggage handlers transport the pallet with the aircraft wheel from the baggage cart to the conveyor belt of the aircraft belt loader. This is the first position 1 that the pallet with the aircraft wheel has in FIG. 1.

In the second position 2, the pallet with the aircraft wheel has been conveyed to about halfway on the conveyor belt.

In the third position 3, the pallet with the aircraft wheel has been conveyed to the front end of the conveyor belt to a position just before it transfers onto the roller track to be transported inside the cargo hold to the end of the roller track, which is the fourth position 4 that the pallet with the aircraft wheel has in FIG. 1.

The illustrated positions are examples only. It is contemplated that the aircraft belt loader does not necessarily comprise a roller track, but only a conveyor belt for transporting the cargo from tarmac level to the cargo hold opening of the aircraft.

Figure 2:
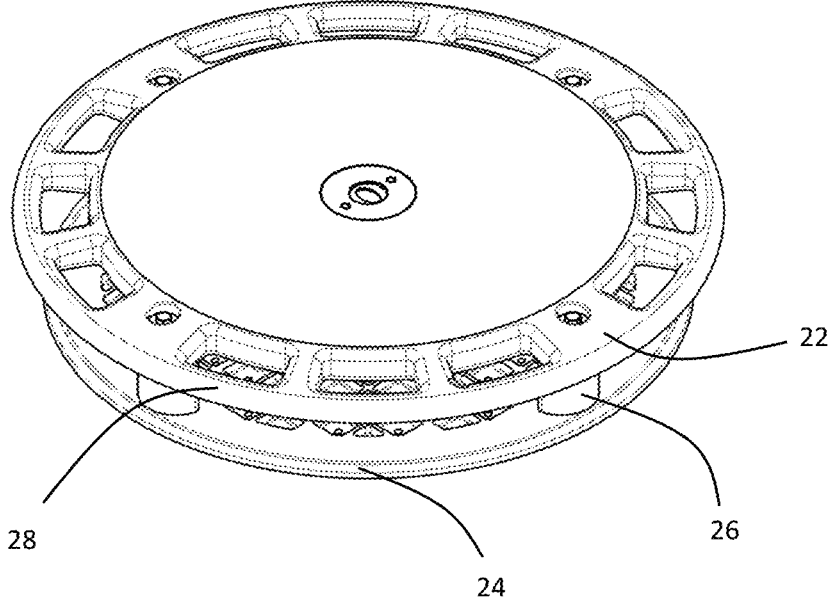
FIG. 2 illustrates a perspective view of an embodiment of a pallet.

FIG. 2 shows a perspective view of a pallet (without the aircraft wheel).

The pallet is illustrated as comprising a top deck 22 (with the upper surface for supporting said cargo), and a bottom deck 24 (with a bottom side supported by the inclined conveyor belt when the pallet is transported by the aircraft belt loader).

Blocks or stringers may be sandwiched between the top deck and the bottom deck.

However, in general it is contemplated that the pallet may have a number of configurations. An example is that the pallet may comprise a single deck. The single deck may be so high (distance from upper surface to bottom side) that it allows for a forklift to insert its fork into the pallet (in suitable openings). However, the pallet may also have such a narrow profile that if it is to be handled by a forklift, the forklift supports the bottom side. Alternatively, the pallet may comprise a deck with a plurality of blocks or stringers—the bottom side is then constituted by the bottom side of each block/stringer, e.g. so that the pallet is supported on the conveyor belt by the blocks/stringers.

In FIG. 2 the pallet is illustrated as a block pallet, e.g. blocks including a first block 26 are used to separate the top deck and the bottom deck from each other, e.g. provide a distance or space between the top deck and the bottom deck such that a forklift may insert its fork in that space for lifting the pallet.

A stringer is a board, e.g. a rectangular plate that is upright, e.g. orthogonal to the top deck (board), while a block is a cylindrically shaped column. Any number of blocks may be used, but in FIG. 2, four blocks are illustrated. A block may also be termed a "leg" or "column".

Even though a forklift is not allowed near an aircraft in some airports, it may be used elsewhere in the airport, for example in an aircraft hangar. Thus, there is an opening for receiving the prongs/tines of the fork of a forklift. The opening may comprise a pair of openings, e.g. on either side of a block or a stringer.

The pallet may be round, e.g. the circumference defines a circle. Both the circumference of the top deck and the bottom deck defines a circle.

The diameter of the pallet may correspond to the diameter of the aircraft wheel, e.g. between 0.5 m and 2 m.

As used herein, the term "round" refers to a circular shape, or an elliptic shape or an oval shape or a polygon having more than 4 sides/faces.

The circumference of the pallet/top deck is provided with handles including a first handle 28.

Twelve handles are illustrated in FIG. 2, but any number of handles may be used as long as they surround the pallet, e.g. distributed around the circumference such that the baggage handler may grip a handle independently of the orientation of the pallet. For example, two handles may be enough if each handle spans more than 90 degrees such as close to 180 degrees.

As used herein, the term "handle" refers to an object or part of the pallet that can be gripped and manipulated by hand, e.g. gripping the handle for pulling the pallet.

In the case the pallet comprises a bottom deck as well, the handles may be around the circumference of the bottom deck instead of being located at the top deck. The handles may also be arranged on the blocks or stringers.

The bottom side is covered with protrusions including a first protrusion 30. Specifically, the protrusions are distributed across the area of the bottom side. The protrusions constitute a diamond shaped pattern.

The protrusions define tips for contacting the conveyor belt, each tip having a clearance/distance to a neighbouring tip.

The protrusions are illustrated as arranged on straight lines parallel to each other, e.g. in a rectangular grid (a grid having (xy) grid-lines orthogonal to each other—the grid lines may also be non-orthogonal).

In general, the protrusions may be arranged in a (second) pattern. The pattern may be random or non-random. For a random pattern the positions of the protrusions do not depend on each other. In a non-random pattern the position of one protrusion may be used to determine the position of another protrusion, e.g. a repeated pattern (a pattern where a group of protrusions repeat themselves as the pattern extends).

It is contemplated that the recesses of the conveyor belt are also arranged in a pattern such that the protrusions fit down into the recesses, e.g. such that when the pallet is supported by the conveyor belt, the tip of a protrusion is closer to the bottom of a valley than the top of a ridge.

This means that the side of a protrusion will come into contact with the side of a recess/ridge when attempting to slide the pallet along the conveyor belt, which makes it more difficult to slide the pallet.

The two patterns (of protrusions and recesses) should not be designed such that the tip of one or more protrusions contacts the top of one or more ridges. This would mean that the pallet would be supported by the ridges and that the pallet could fall down if the conveyor belt becomes inclined. In order to reduce the risk of this happening, it is contemplated that the second pattern may be a function of the first pattern, e.g. the second pattern is designed as a function of how the first pattern is designed. For example, if the valleys are arranged at the nodes of a grid the protrusions.

% Specific Protrusion Design

Each protrusion has a polygon base, e.g. a base having a plurality of edges/sides. On a side note, a polygon defines a round shape when there is an infinite number of edges in the polygon (mathematically speaking). Likewise, each protrusion has a polygon or round top.

The top is the part of the protrusion that contacts or is closest to the conveyor belt, while the base is the part at the opposite end of the protrusion.

Figure 3:
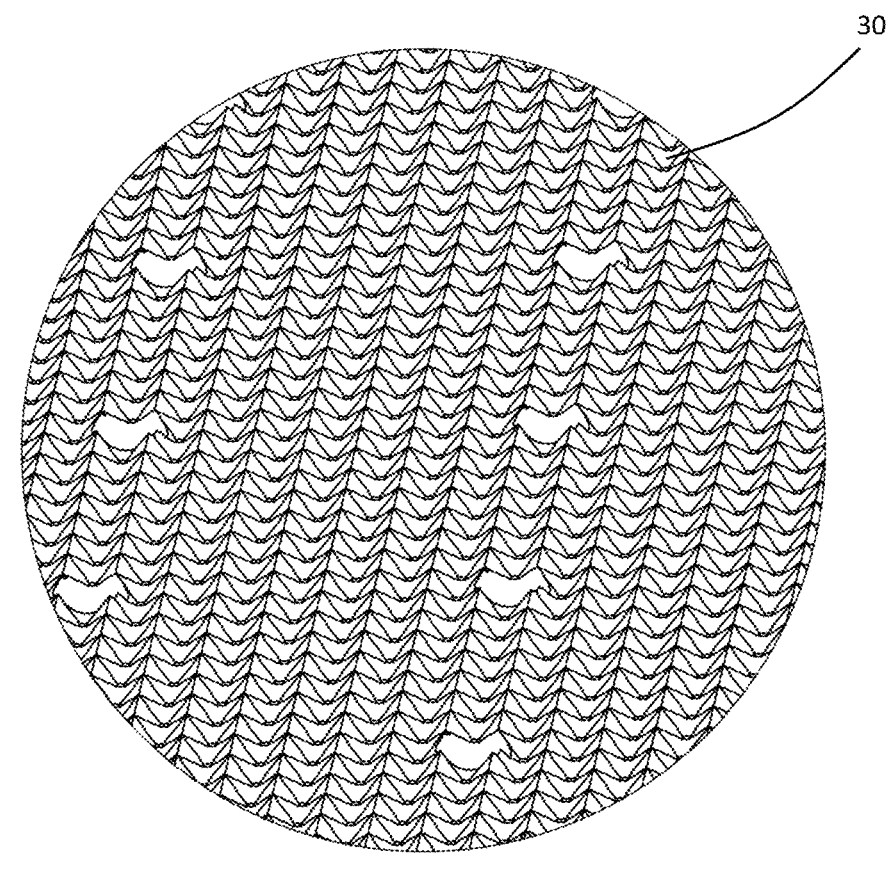
FIG. 3 illustrates a perspective view of a bottom side of an embodiment of a pallet.
Figure 4:
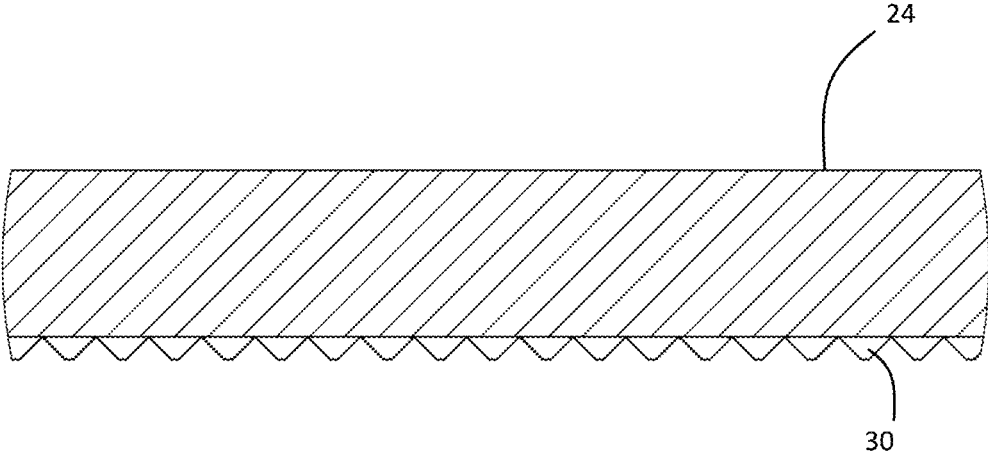
FIG. 4 illustrates a cross-section view of a bottom side of an embodiment of a pallet.

In FIG. 3 each protrusion is illustrated as a truncated pyramid with a quadratic base. The base may have another number of sides than four. In general, it may be a polyhedron, but with a top that is preferably truncated.

In the following, the design of each protrusion, or at least one of the protrusions such as the first protrusion, is described.

Each protrusion/pyramid is tapered, e.g. it has a base with a larger area or circumference than the area or circumference of the top.

Preferably, each protrusion is truncated, e.g. it does not end in a tip (a tip may be defined as a point, e.g. an infinitesimal small area). The pyramids are upside down when the pallet stands on the conveyor belt during the intended operational use.

Each protrusion may have a distance from base to top greater than 1 mm, such as in the range 1 to 5 mm or 2 to 4 mm, such as 3 mm.

Each protrusion may have a base with each side being in the range 4 to 20 mm, such as 7 mm.

Each side of the top may be 5 to 20 times smaller than each side of the base, such as a ratio of 1:7, e.g. a side of the base may be 7 times longer than a side of the top.

In this way is defined a textured bottom surface of the pallet. This provides enhanced friction between the pallet and the inclined conveyor belt—enough to ensure that the pallet does not slide when supporting an aircraft wheel, unless the inclination becomes too large. Typically, the inclination of the conveyor belt of an aircraft belt loader is in the range 5 to 22 degrees.

There may be two types of geometric shapes for the protrusions, e.g. a first plurality of protrusions with one shape and a second plurality of protrusions with another shape.

The side(s) of a protrusion, such as the first protrusion may, be substantially straight or have straight sections—for example defined by a (open) polygon having a number of sides, e.g. each side may be non-curved or having a radius for the incircle (the inscribed circle of the polygon) much greater than the length of the side, such as more than 10 times the length.

In embodiments, the pallet may be made of plastic.

The following description is a summary of the features of the present disclosure arranged according to subject.

1. A pallet for transporting cargo on an inclined conveyor belt, said inclined conveyor belt having a surface texture including a plurality of recesses arranged in a first pattern, said pallet comprising:

an upper surface for supporting said cargo and a bottom side supported by said inclined conveyor belt during the intended operational use.

2. The pallet according to any of the preceding items, said bottom side having a plurality of protrusions including a first protrusion distributed across the area of said bottom side in a second pattern such that said plurality of protrusions fits down into said plurality of recesses for arresting said pallet when said pallet is transported on said inclined conveyor belt.

3. The pallet according to any of the preceding items, comprising:

blocks or stringers sandwiched between a top deck and a bottom deck, said top deck comprising said upper surface and said bottom deck comprising said bottom side.

4. The pallet according to any of the preceding items, comprising:

one or more openings for receiving a pair of prongs of a forklift.

5. The pallet according to any of the preceding items, having a round shape.

6. The pallet according to any of the preceding items, comprising:

handles around the circumference of said pallet.

7. The pallet according to any of the preceding items, comprising:

a fixture at the center of said pallet for fixating an aircraft wheel to said pallet.

% Protrusions

8. The pallet according to any of the preceding items, said first protrusion having a base defining an area.

9. The pallet according to any of the preceding items, said first protrusion having a top defining an area, said top preferably having an area smaller than the area defined by said bottom.

10. The pallet according to any of the preceding items, said first protrusion being tapered.

11. The pallet according to any of the preceding items, said first protrusion being truncated.

12. The pallet according to any of the preceding items, said first protrusion having a polygon or round base.

13. The pallet according to any of the preceding items, said first protrusion having a polygon or round top.

14. A system for transporting cargo, said system comprising:

an inclined conveyor belt, and the pallet according to any of the preceding items, said inclined conveyor belt having a surface texture including a plurality of recesses.

The invention claimed is:

1. A system for transporting cargo between an aircraft cargo hold and a tarmac level, the system comprising:

an inclined conveyer belt having a surface texture including a plurality of recesses defining a first pattern of valleys and ridges; and a pallet comprising:

a body having a round shape and defining a circumference, the body comprising:

one or more openings for receiving a pair of prongs of a forklift, an upper surface, and a bottom surface opposite the upper surface, the bottom surface defining an area and having a plurality of protrusions, each protrusion of the plurality of protrusions comprising a tip distal to the upper surface and the bottom surface, the plurality of protrusions including a first protrusion defining a truncated pyramid shape, the plurality of protrusions being distributed across the area of the bottom surface in a second pattern such that the plurality of protrusions are correspondingly shaped and sized with the plurality of recesses, such that, when the inclined conveyer belt supports the body, the recesses and the protrusions interact to maintain a positioning of the pallet on the inclined conveyer belt, each tip extending into the recess at a depth greater than a midpoint of the recess;

a plurality of handles disposed around the circumference of the body;

a top deck comprising the upper surface;

a bottom deck opposite the top deck, the bottom deck comprising the bottom surface; and a plurality of blocks or stringers disposed between the top deck and the bottom deck.

2. The system according to claim 1, further comprising:

a fixture disposed at a center of the body, the fixture configured to fix an aircraft wheel to the pallet.

3. The system according to claim 1, wherein each protrusion of the plurality of protrusions comprises a base defining an area.

4. The system according claim 3, wherein each protrusion of the plurality of protrusions comprises a top defining an area.

5. The system according to claim 4, wherein the area of the top of each protrusion is smaller than the area of the base of each protrusion.

6. The system according to claim 3, wherein the base is a polygon, an elliptical, or circular.

7. The system according to claim 4, wherein the top of the first protrusion is a polygon, an elliptical, or circular.

8. The system according to claim 1, further comprising an aircraft wheel supported by the pallet.

9. The system according to claim 1, wherein each protrusion is tapered.

\* \* \* \* \*